V. MANCINI.
MACARONI MAKER.
APPLICATION FILED MAY 24, 1915.
1,170,304.
Patented Feb. 1, 1916.
2 SHEETS—SHEET 1.
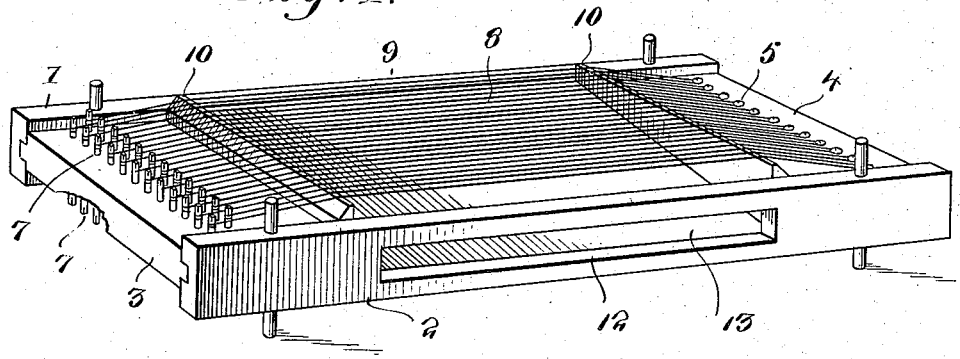
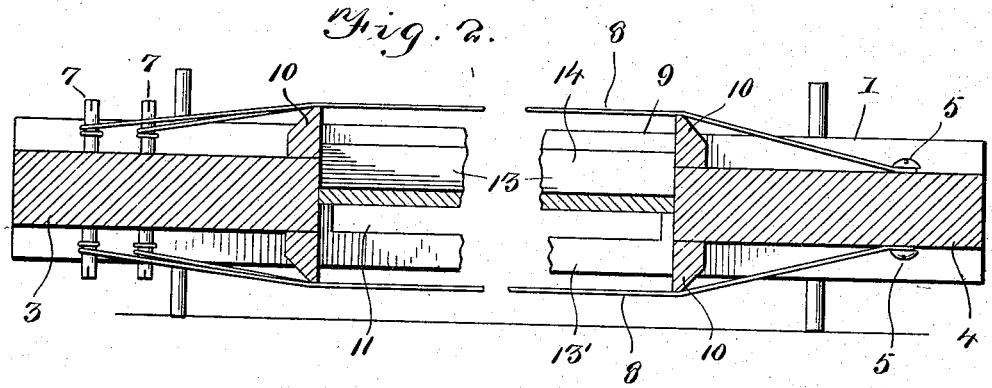
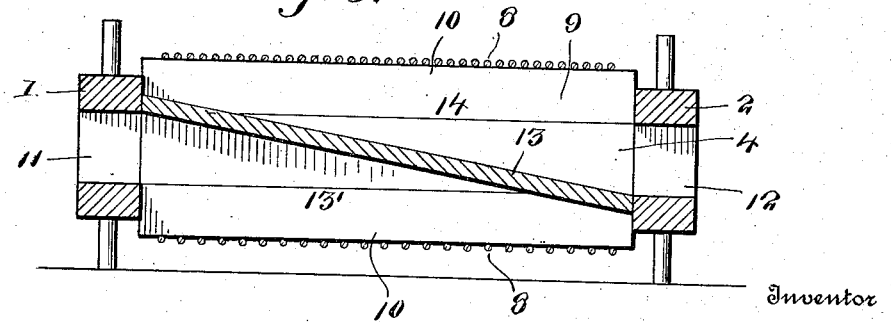
Witnesses
E. R. Ruppert.
C. C. Hines.
Inventor
Victor Mancini
By Victor J. Evans
Attorney

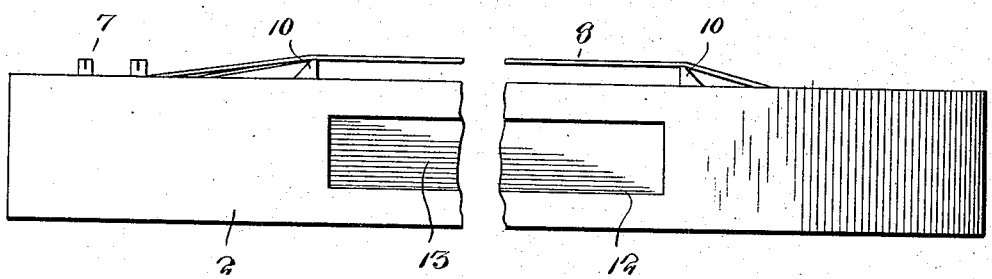
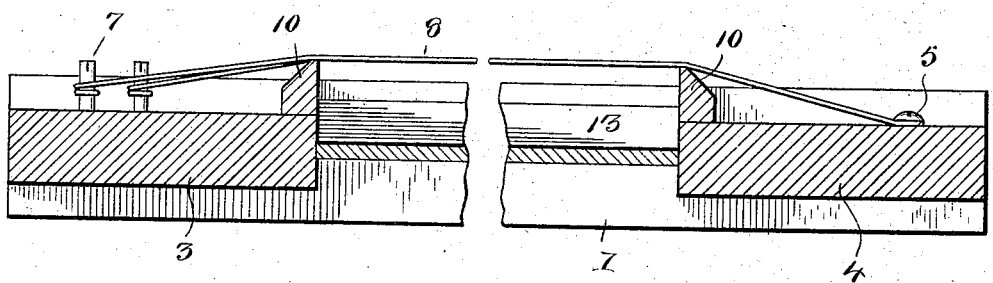
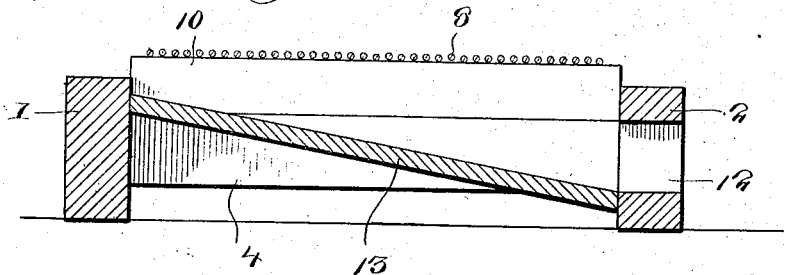

UNITED STATES PATENT OFFICE.

VICTOR MANCINI, OF GRANVILLE, NEW YORK.

MACARONI-MAKER.

1,170,304.  Specification of Letters Patent.  Patented Feb. 1, 1916.

Application filed May 24, 1915. Serial No. 30,100.

*To all whom it may concern:*

Be it known that I, VICTOR MANCINI, a citizen of the United States, residing at Granville, in the county of Washington and State of New York, have invented new and useful Improvements in Macaroni-Makers, of which the following is a specification.

My invention relates to a cutter or device for making macaroni and other similar substances from a sheet of dough, the object of the invention being to provide a device by means of which the dough may be conveniently cut into strips and the strips then discharged into a suitable receptacle so as to be handled in a cleanly and sanitary manner.

A further object of the invention is to provide a double type of cutter which is reversible for use upon different sides thereof so that different kinds of substances of the general character specified may be made upon one and the same device.

The invention consists of the features of construction, combination and arrangement of parts herein fully described and claimed, reference being had to the accompanying drawings in which:—

Figure 1 is a perspective view of a macaroni cutter embodying my invention. Figs. 2 and 3 are vertical longitudinal and vertical transverse sections, respectively, of the same. Fig. 4 is a perspective view of the reverse side of the cutter from that shown in Fig. 1. Fig. 5 is a perspective view of a modified form of cutter. Fig. 6 is a vertical transverse section of the same.

In Figs. 1 to 4, inclusive, I have shown a double cutter, while in Figs. 5 and 6 I have shown a single cutter, which cutters have certain new and improved structural features in common. As shown, the cutter illustrated in Figs. 1 to 4, inclusive, comprises a pair of parallel side bars 1 and 2 and end pieces or cross bars 3 and 4, which are united in any firm and substantial manner. The bars 3 and 4 are of less depth or thickness than the depth of the bars 1 and 2, so as to lie some distance inwardly of the top and bottom surfaces of the latter, and upon which side of the bar 4 are disposed fastening screws or pins 5, while upon each side of the bar 3 are disposed pins 7. Stretched longitudinally between the screws and pins are cutting wires 8, which may be of any suitable size, number and arrangement, and which may be tensioned by adjusting certain of the pins 7, which are revolubly mounted for that purpose. The wires pass longitudinally over the central opening 9 in the frame and in contact with bridge pieces 10 disposed along the inner edges of the cross bars 3 and 4.

Formed in the bars 1 and 2 and extending entirely through said bars from side to side are longitudinally extending discharge slots or openings 11 and 12, and disposed within the space or opening 9 of the frame is a partition board or plate 13, which board or plate is suitably secured in position. This board or plate extends the full length of the opening 9 and diagonally of the frame in a transverse direction, one of its longitudinal edges being secured to the bar 1 between the slot 11 and one of the horizontal surfaces of said bar, while the other longitudinal edge of the partition is secured to the bar 2 between the slot 12 and the opposite horizontal surface of said bar, so that when one face of the frame is uppermost the partition will form a gathering tray or compartment 13 sloping toward the slot 9, while when the opposite face of the frame is uppermost the partition will form a tray or chamber 14 and sloping toward the slot 10. The reverse surfaces of the board are therefore adapted for use in making macaroni, noodles or other analogous substances.

In the use of the device, it will be understood that the device is rested upon a bench or table with the desired side uppermost, and the sheet of dough to be formed into macaroni or noodles is placed upon the cutting wires. By thus running a roller over the dough, the dough will be pressed through the strands and cut into strips to form the macaroni or noodles. These strips will fall into the underlying tray or chamber and will discharge by gravity through the communicating outlet slot. By reversing the device the opposite side thereof may be employed for the manufacture of macaroni or noodles in like manner. It will be understood that the cutters at the opposite sides of the device may be of different sizes and arrangements so that the device can be used for cutting strips of different sizes or materials for the manufacture of different substances or the same substances of different sizes or grades.

In the modified form of my invention shown in Figs. 5 and 6 the same structure is employed with the exception that one of the discharge slots is omitted, and also one of the sets of cutters, making the device a single cutter. With this construction the partition may be disposed horizontally if desired.

I claim:—

1. A device of the character described comprising an oblong rectangular frame bounding a correspondingly shaped opening, one of the side bars of said frame being provided with a longitudinally extending discharge slot, cutting wires extending over and longitudinally of said opening, and an inclined partition plate within the opening forming a collection tray and an inclined plane sloping toward said discharge slot.

2. A device of the character described comprising an oblong rectangular frame bounding a correspondingly shaped opening, the side bars of said frame being provided with longitudinally extending discharge slots, cutting wires extending over and longitudinally of the opening at the opposite sides of the frame, and a partition disposed within said opening in an inclined position so as to provide opposite collection chambers and surfaces sloping toward the respective slots.

In testimony whereof I affix my signature in presence of two witnesses.

VICTOR MANCINI.

Witnesses:
 OSCAR P. MUNSON,
 L. B. WILLIAMS.

Copies of this patent may be obtained for five cents each, by addressing the "Commissioner of Patents, Washington, D. C."